(12) United States Patent
Kanemoto (10) Patent No.: US 8,854,696 B2
(45) Date of Patent: Oct. 7, 2014

(54) FACSIMILE APPARATUS CAPABLE OF TRANSMITTING CONVERTED FAX DATA TO TRANSMISSION SOURCE APPARATUS BASED ON IDENTIFCATION OF THE TRANSMISSION SOURCE APPARATUS

(75) Inventor: Ayako Kanemoto, Nisshin (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 116 days.

(21) Appl. No.: 13/424,689

(22) Filed: Mar. 20, 2012

(65) Prior Publication Data

US 2012/0250099 A1 Oct. 4, 2012

(30) Foreign Application Priority Data

Mar. 31, 2011 (JP) ................................. 2011-077002

(51) Int. Cl.
*H04N 1/00* (2006.01)
*H04N 1/32* (2006.01)

(52) U.S. Cl.
CPC ...................... *H04N 1/00* (2013.01)
USPC ........... 358/435; 358/405; 358/407; 358/436; 358/438; 358/439; 358/440; 358/442

(58) Field of Classification Search
CPC ............ H04N 1/0022; H04N 1/00212; H04N 1/00214; H04N 1/00217; H04N 1/00244; H04N 2201/0093; H04N 2201/0094; H04N 2201/3207; H04N 2201/3208; H04N 2201/3209
See application file for complete search history.

(56) References Cited

U.S. PATENT DOCUMENTS

| | | | |
|---|---|---|---|
| 2001/0013122 A1 | 8/2001 | Hirata | |
| 2003/0079231 A1 | 4/2003 | Hirata | |
| 2005/0036167 A1* | 2/2005 | Atsumi | ........................ 358/1.15 |
| 2010/0191815 A1* | 7/2010 | Koue et al. | .................... 709/206 |

FOREIGN PATENT DOCUMENTS

| | | |
|---|---|---|
| JP | H10-207670 A | 8/1998 |
| JP | H10-261251 A | 9/1998 |
| JP | H10-269038 A | 10/1998 |
| JP | 2002-091890 A | 3/2002 |
| JP | 2004-056658 A | 2/2004 |
| JP | 2006-253978 A | 9/2006 |

OTHER PUBLICATIONS

Machine translation (in english) of JP Pub 2006-253978 to Ogawa Masahiro.*
Japan Patent Office, Notice of Reasons for Rejection for Japanese Patent Application No. 2011-077002 (counterpart to above-captioned patent application), mailed Apr. 9, 2013.

* cited by examiner

*Primary Examiner* — Benny Q Tieu
*Assistant Examiner* — Harris Sabah
(74) *Attorney, Agent, or Firm* — Baker Botts L.L.P.

(57) ABSTRACT

A facsimile device includes a facsimile receiving unit that receives facsimile data transmitted from a transmission source device, a storing unit that stores identification information and transmission source information of the facsimile data received by the facsimile receiving unit in a storing portion. The identification information distinguishes the facsimile data received by the facsimile receiving unit from other facsimile data received by the facsimile receiving unit, and the transmission source information indicates the transmission source device of the facsimile data. The facsimile device also includes a message transmitting unit that transmits a message to an external device in response to receiving the facsimile data from the transmission source device, the message including the identification information and the transmission source information of the facsimile data stored in the storing portion, and a message receiving unit that receives a message transmitted from the external device or from another external device.

14 Claims, 7 Drawing Sheets

Fig.2

FACSIMILE APPARATUS CAPABLE OF TRANSMITTING CONVERTED FAX DATA TO TRANSMISSION SOURCE APPARATUS BASED ON IDENTIFCATION OF THE TRANSMISSION SOURCE APPARATUS

CROSS REFERENCE TO RELATED APPLICATION

This application claims priority from Japanese Patent Application No. 2011-077002, filed on Mar. 31, 2011, the entire disclosure of which is incorporated herein by reference.

BACKGROUND OF THE INVENTION

1. Field of the Invention

The present invention generally relates to facsimile devices.

2. Description of Related Art

A known, personal computer facsimile (PC-FAX) system may facsimile-transmit a transmission document created by a computer via a facsimile device connected to the computer by a network.

SUMMARY OF THE INVENTION

In the known, PC-FAX system, when transmitting a reply to previously received facsimile data, the reply address, e.g., FAX number, is input by hand or selected from an address book by a user. Thus, additional time and effort are required for transmitting a reply.

A technical advantage of the present invention is that a facsimile device is provided that is capable of readily setting the transmission destination of transmission data to be transmitted in response to facsimile data received from a transmission source device.

According to an embodiment of the invention, a facsimile device comprising: a facsimile receiving unit configured to receive facsimile data transmitted from a transmission source device; a storing unit configured to store at least one of identification information and transmission source information of the facsimile data received by the facsimile receiving unit in a storing portion, wherein the identification information distinguishes the facsimile data received by the facsimile receiving unit from other facsimile data received by the facsimile receiving unit, and the transmission source information indicates the transmission source device of the facsimile data; a message transmitting unit configured to transmit a message to an external device in response to receiving the facsimile data from the transmission source device, the message including the at least one of the identification information and the transmission source information of the facsimile data stored in the storing portion; and a message receiving unit configured to receive a message transmitted from the external device or from another external device.

According to another embodiment of the invention, a method for transmitting message from a facsimile device, the method comprising the steps of: receiving facsimile data transmitted from a transmission source device; storing at least one of identification information and transmission source information of the received facsimile data in a storing portion, wherein the identification information distinguishes the facsimile data received by the facsimile receiving unit from other facsimile data received by the facsimile receiving unit, and the transmission source information indicates the transmission source device of the facsimile data; transmitting a message to an external device in response to receiving the facsimile data from the transmission source device, wherein the message including at least one of the identification information and the transmission source information of the facsimile data stored in the storing portion; and receiving a message transmitted from the external device or from another external device.

According to still another embodiment of the invention, a non-transitory, computer readable medium storing a message transmitting program that, when executed by a processor, cause a facsimile device to execute steps comprising: receiving facsimile data transmitted from a transmission source device; storing at least one of identification information and transmission source information of the received facsimile data in a storing portion, wherein the identification information distinguishes the facsimile data received by the facsimile receiving unit from other facsimile data received by the facsimile receiving unit, and the transmission source information indicates the transmission source device of the facsimile data; transmitting a message to an external device in response to receiving the facsimile data from the transmission source device, wherein the message including at least one of the identification information and the transmission source information of the facsimile data stored in the storing portion; and receiving a message transmitted from the external device or from another external device.

Other objects, features, and advantages of an embodiment of the invention will be apparent to persons of ordinary skill in the art from the following description of an embodiment with reference to the accompanying drawings.

DETAILED DESCRIPTION OF EMBODIMENTS

For a more complete understanding of the present invention, needs satisfied thereby, and the objects, features, and advantages thereof, reference now is made to the following description taken in connection with the accompanying drawings.

Figure 1:
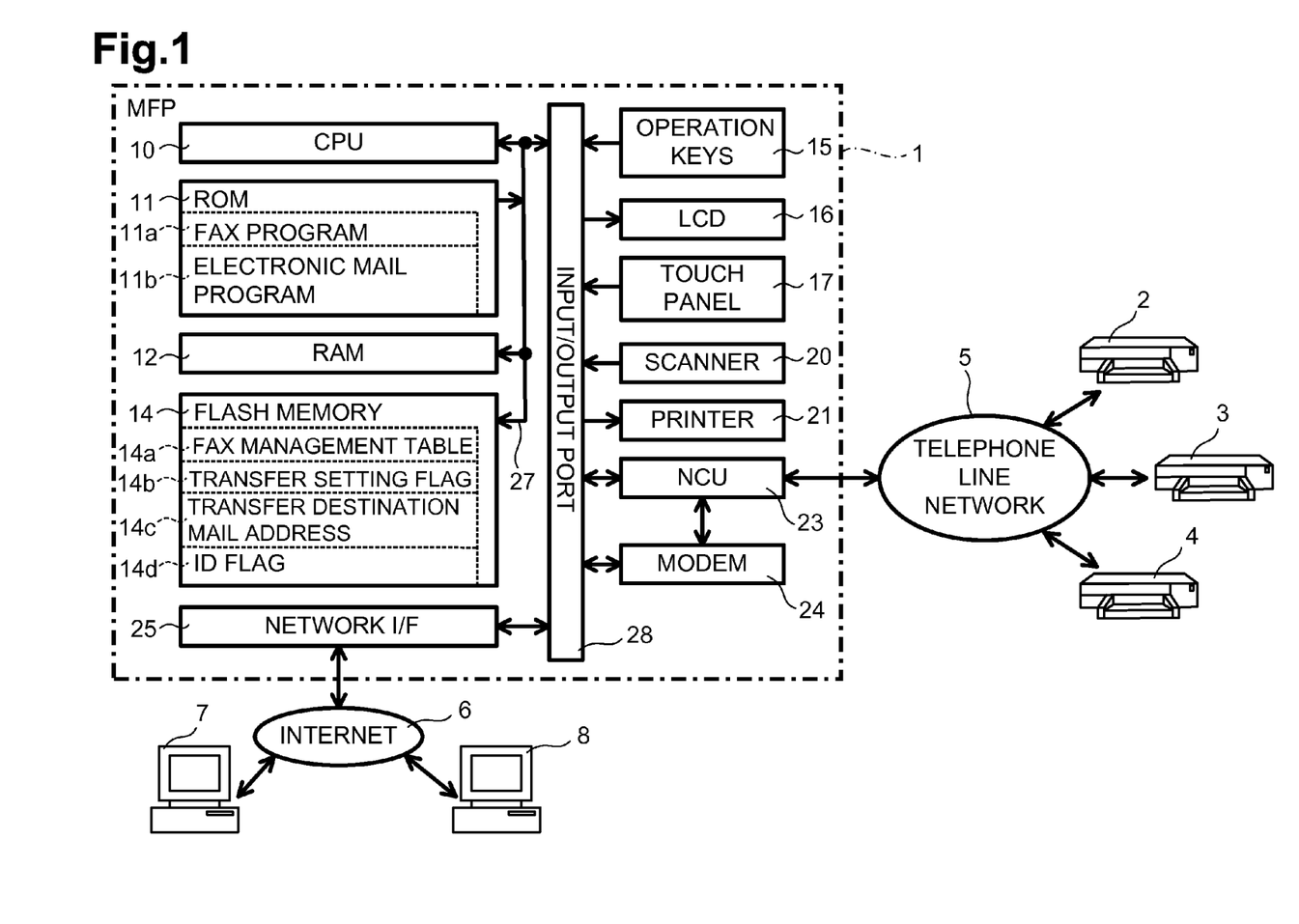
FIG. 1 is a block diagram depicting an electrical configuration of a multi-function peripheral ("MFP") according to an embodiment of the present invention.

Referring to FIG. 1, a multi-function peripheral ("MFP") 1 may be a device configured to perform a variety of functions, e.g., a copier function, a facsimile function, a scanner function, and a printer function. MFP 1 may be capable of readily setting the transmission destination of transmission data, e.g., return data, to be transmitted in response to facsimile data received from a transmission source device.

MFP 1 may comprise a central processing unit ("CPU") 10, a read-only memory ("ROM") 11, a random access memory ("RAM") 12, a flash memory 14, operation keys 15, a liquid crystal display ("LCD") 16, a touch panel 17, a scanner 20, a printer 21, a network control unit ("NCU") 23, a modem 24, and a network interface ("I/F") 25.

CPU 10, ROM 11, RAM 12, and flash memory 14 may be connected to each other via a bus line 27. Operation keys 15, LCD 16, touch panel 17, scanner 20, printer 21, NCU 23, modem 24, network I/F 25, and bus line 27 may be connected to each other via an input/output port 28.

Figure 5:
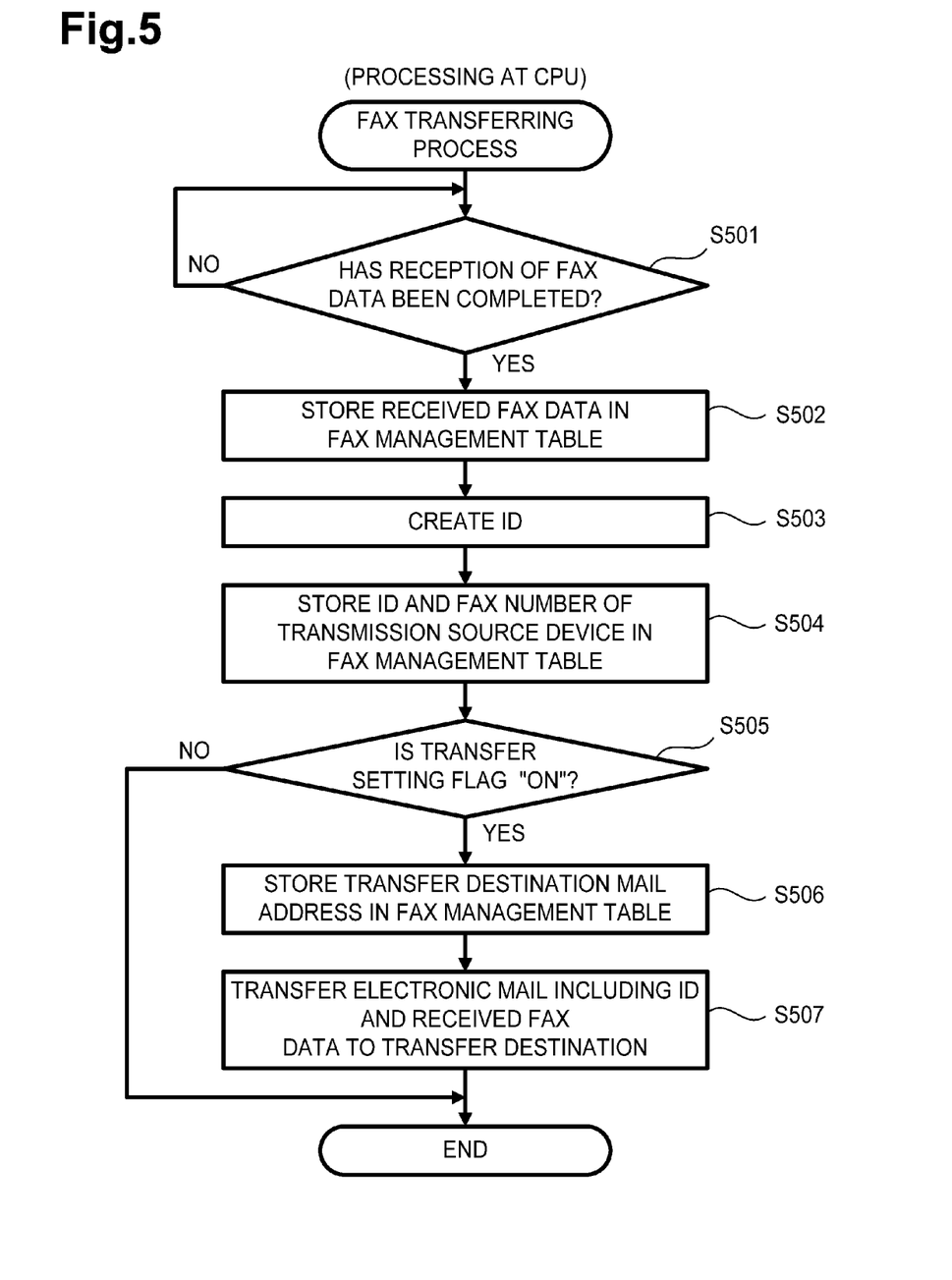
FIG. 5 is a flowchart depicting a facsimile ("FAX") transferring process according to an embodiment of the present invention.
Figure 6:
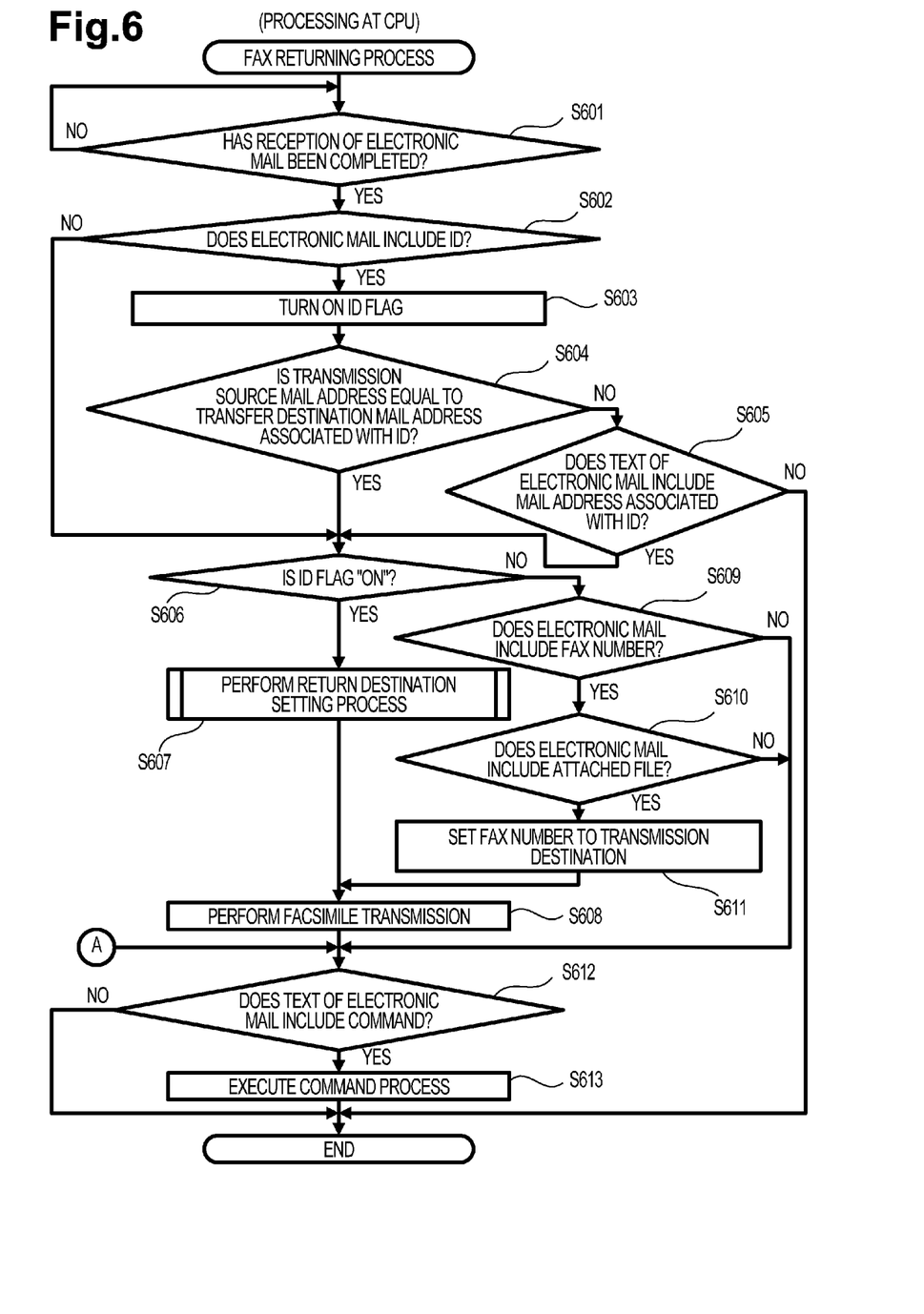
FIG. 6 is a flowchart depicting a FAX returning process according to an embodiment of the present invention.
Figure 7:
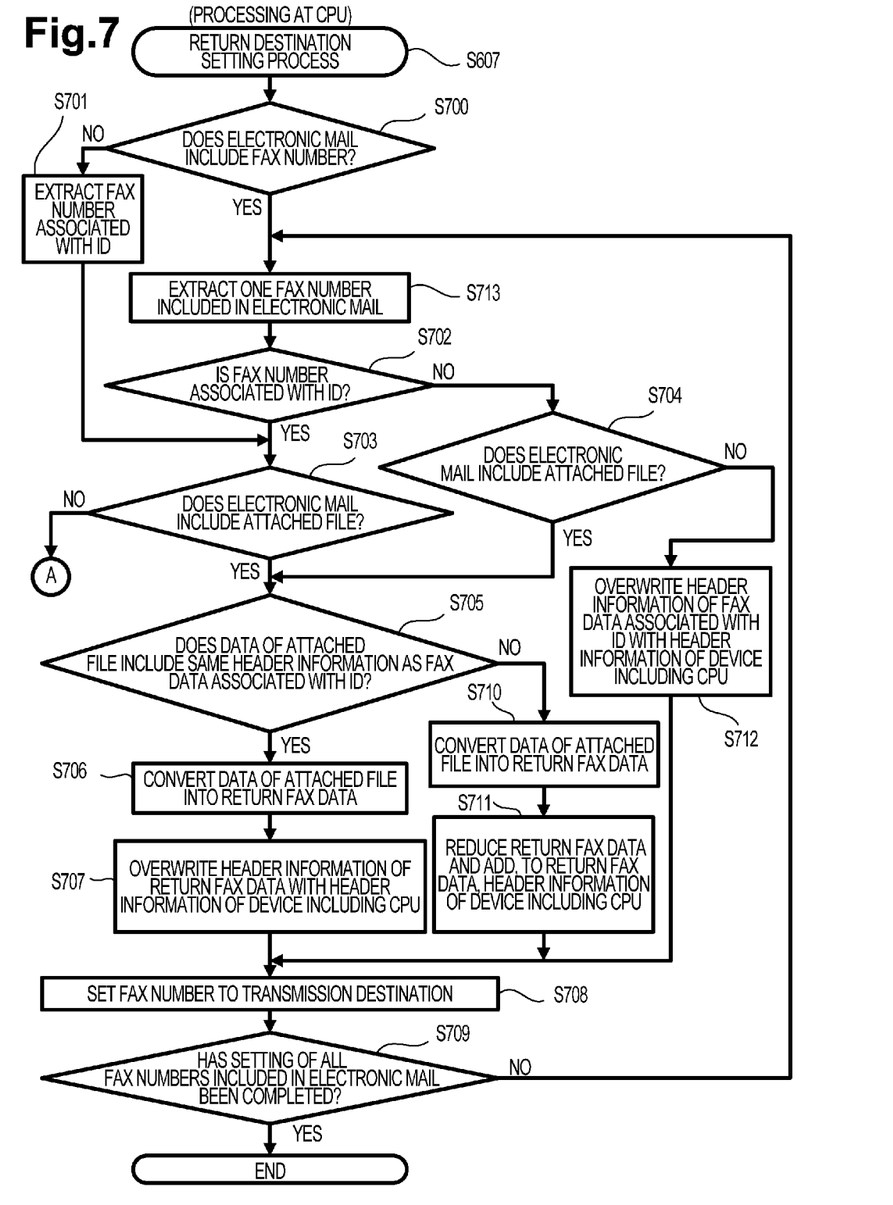
FIG. 7 is a flowchart depicting a return destination setting process according to an embodiment of the present invention.

CPU 10 may control MFP 1 to perform the respective functions and may control the respective units connected to input/output port 28 in accordance with fixed values and programs stored in ROM 11 and flash memory 14, data stored in the RAM 12, or a variety of signals transmitted and received via NCU 23. ROM 11 may be a non-rewritable memory storing a FAX program 11a and an electronic mail program 11b. In accordance with FAX program 11a and electronic mail program 11b, CPU 10 may execute a FAX transferring process, a FAX returning process, and a return destination setting process, as depicted in FIGS. 5-7. CPU 10 may transmit and receive electronic mails in accordance with electronic mail program 11b.

In accordance with FAX program 11a and electronic mail program 11b, CPU 10 may attach received facsimile data to an electronic mail as an attached file and may transmit the electronic mail to another device. When an electronic mail is received, and the electronic mail has a file attached thereto, CPU 10 may facsimile-transmit the attached file to another device as facsimile data.

Flash memory 14 may be a non-volatile rewritable memory storing a FAX management table 14a, a transfer setting flag 14b, a transfer destination mail address 14c, and an identifier ("ID") flag 14d. FAX management table 14a may store an ID indicating that the facsimile data, ("FAX data") has been received, the FAX number of the transmission source device of the received FAX data, the electronic mail address ("E-mail address") of the transfer destination of the received FAX data, and the received FAX data in association with one another.

Transfer setting flag 14b may be a flag indicating whether MFP 1 transfers the FAX data to transfer destination mail address 14c when the FAX data is received. When the FAX data is to be transferred, transfer setting flag 14b may be set to "ON." When the FAX data is not to be transferred, transfer setting flag 14b may be set to "OFF." A user may set transfer setting flag 14b by operating operation keys 15.

Transfer destination mail address 14c may be the mail address of the transfer destination, to which received FAX data is to be transmitted. The received FAX data may be attached to an electronic mail as an attached file and transferred to the transfer destination. Transfer destination mail address 14c may comprise a plurality of mail addresses. Further, different transmission destinations may be set in accordance with the transmission source of the received FAX data, and the FAX data may be transferred to different transfer destinations in accordance with the transmission source of the received FAX data.

ID flag 14d may indicate whether the electronic mail received by MFP 1 includes the ID stored in FAX management table 14a. When the electronic mail includes the ID, ID flag 14d may be set to "ON."

Operation keys 15 may be push buttons for receiving instructions from a user. Operation keys 15 may comprise a start key and numeric keys. LCD 16 may be a liquid crystal display device displaying an operation procedure or messages, e.g., a message to the user. Touch panel 17 may be provided in the entire screen of LCD 16. Touch panel 17 may detect a position on the screen of LCD 16 touched by the user.

CPU 10 may receive the instructions from the user in accordance with the touched position.

In the execution of the facsimile function, the scanner function, or the copier function, scanner 20 may perform a reading operation of reading and converting the image of a document into electronic data. In the execution of the facsimile function or the printer function, printer 21 may perform a printing operation of printing an image on a print sheet.

NCU 23 may control telephone line, and may be connected to facsimile devices 2, 3, and 4 via a telephone line network 5. The transmission and reception of FAX data to and from facsimile devices 2, 3, and 4 may be performed via telephone line network 5 and NCU 23. In facsimile transmission, modem 24 may modulate transmission signals into a form suitable for the transmission in telephone line network 5. In facsimile reception, modem 24 may demodulate modulated signals transmitted from telephone line network 5.

Network I/F 25 may be an interface for connecting to personal computers 7 and 8 ("PC's 7 and 8") via internet 6. The transmission and reception of electronic mails to and from PC's 7 and 8 may be performed via the internet 6, network I/F 25, and an electronic mail server. In another embodiment, network I/F 25 may be connected to PC's 7 and 8 via a local area network.

PC's 7 and 8 may store an electronic mail program provided with a return function for replying to a received electronic mail and a transfer function for transferring a received electronic mail to another device. The return function may create and return an electronic mail by adding a character string "Re:," which indicates a reply to the subject described in the received electronic mail. The transfer function may create and transfer an electronic mail by adding a character string "FW:," which indicates a transfer of the subject described in the received electronic mail.

Further, the transfer function may create and transfer an electronic mail, such that the text of the electronic mail includes the electronic mail address of the transfer source device. For example, when PC 7 transfers to PC 8 an electronic mail received from MFP 1, the text of the electronic mail may include the mail address of MFP 1. Further, when PC 8 transfers the electronic mail received from PC 7 to MFP 1, the text of the electronic mail may include the mail address of MFP 1 and the mail address of PC 7.

When the transfer destination previously has been set and stored for the electronic mail received from a specific transmission source, such that the transfer destination is associated with the specific transmission source, the transfer function may transfer the electronic mail to the transfer destination. For example, if PC 8 previously was set and stored as the transfer destination in association with MFP 1 in PC 7, in response to receiving an electronic mail from MFP 1, PC 7 may transfer the received electronic mail to PC 8. PC's 7 and 8 may include a program, e.g., a document creation application, for creating return data.

Figure 2:
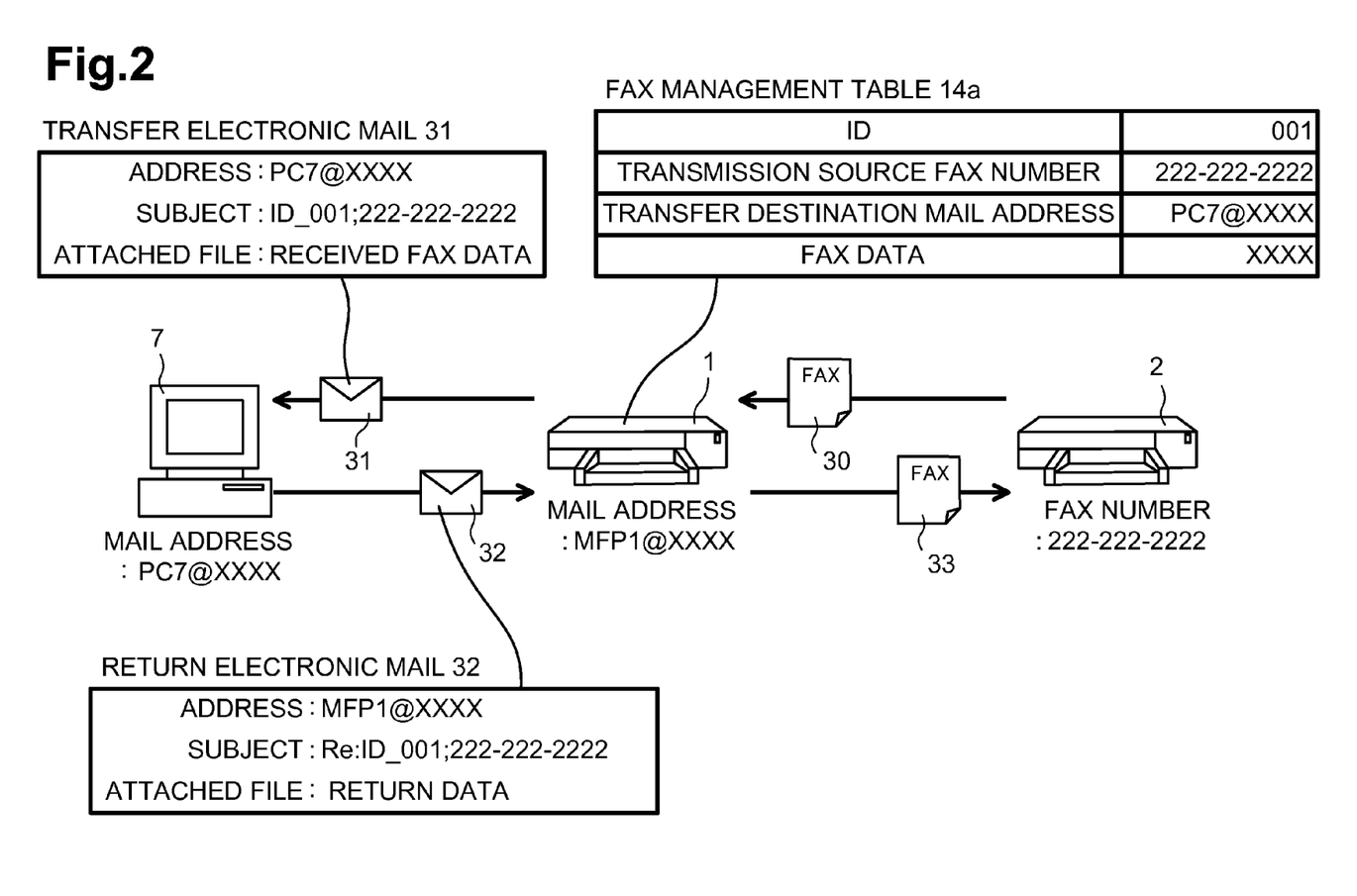
FIG. 2 is a diagram depicting the functions of an MFP according to an embodiment of the present invention.

Referring to FIG. 2, an embodiment of the functions of MFP 1 is depicted. MFP 1 may receive Fax data 30 from facsimile device 2. MFP 1 may transmit a reply to facsimile device 2 via PC 7 in response to receiving FAX data 30 from facsimile device 2. MFP 1 may transfer FAX data 30 through a transfer electronic mail 31 to the mail address of PC 7 stored as transfer destination mail address 14c. In transfer electronic mail 31, the address may be set to a mail address of the PC 7, e.g., "PC7@XXXX," and the subject may include an ID, e.g., "001," and a FAX number of facsimile device 2, e.g., "222-

222-2222," which is the transmission source device. The received FAX data may be attached to transfer electronic mail 31 as an attached file.

Further, upon receipt of FAX data 30 from facsimile device 2, MFP 1 may create FAX management table 14a. FAX management table 14a may store the ID, e.g., "001," indicating that FAX data 30 has been received, the FAX number, e.g., "222-222-2222," of facsimile device 2 as the transmission source FAX number, the mail address of the PC 7, e.g., "PC7@xxxx," as the transfer destination, and the received FAX data, e.g., "XXXX," in association with one another.

Upon receipt of transfer electronic mail 31 from MFP 1, PC 7 may create return data and may return the return data to MFP 1 by attaching the return data to a return electronic mail 32 using the return function of the electronic mail program. In return electronic mail 32, the address may be set to a mail address of MFP 1, e.g., "MFP1@XXXX," and the subject may include the ID, e.g., "001," and the FAX number of facsimile device 2, e.g., "222-222-2222." The return data may be attached to return electronic mail 32 as an attached file.

Upon receipt of return electronic mail 32 from PC 7, MFP 1 may set the FAX number of the facsimile device 2 included in the subject of the return electronic mail 32, e.g., "222-222-2222," as the transmission destination when return electronic mail 32 includes the ID, e.g., "001." MFP 1 may then transmit the return data attached to return electronic mail 32 as return FAX data 33 to the set transmission destination, e.g., facsimile device 2.

If the subject of return electronic mail 32 does not include the FAX number of facsimile device 2, e.g., the user of PC 7 deleted the FAX number of facsimile device 2 from the subject of return electronic mail 32, the transmission destination may be set to the FAX number of facsimile device 2 stored in FAX management table 14a in association with the ID, e.g., "001," included in return electronic mail 32, and the return data may be transmitted to facsimile device 2 as return FAX data 33.

Thus, upon receipt of FAX data 30 from facsimile device 2, the ID, e.g., "001," and the FAX number, e.g., "222-222-2222," of facsimile device 2 may be stored in FAX management table 14a in association with each other. Further, if return electronic mail 32 received from PC 7 includes the ID, e.g., "001," the transmission destination of the return data attached to return electronic mail 32 may be set to facsimile device 2, which is the transmission source of the received FAX data. Thus, a reply to the FAX data received from facsimile device 2 may be sent, without inputting the FAX number of facsimile device 2. Therefore, it is possible to readily set the transmission destination of the return data to be transmitted in response to FAX data 30 received from facsimile device 2.

Figure 3:
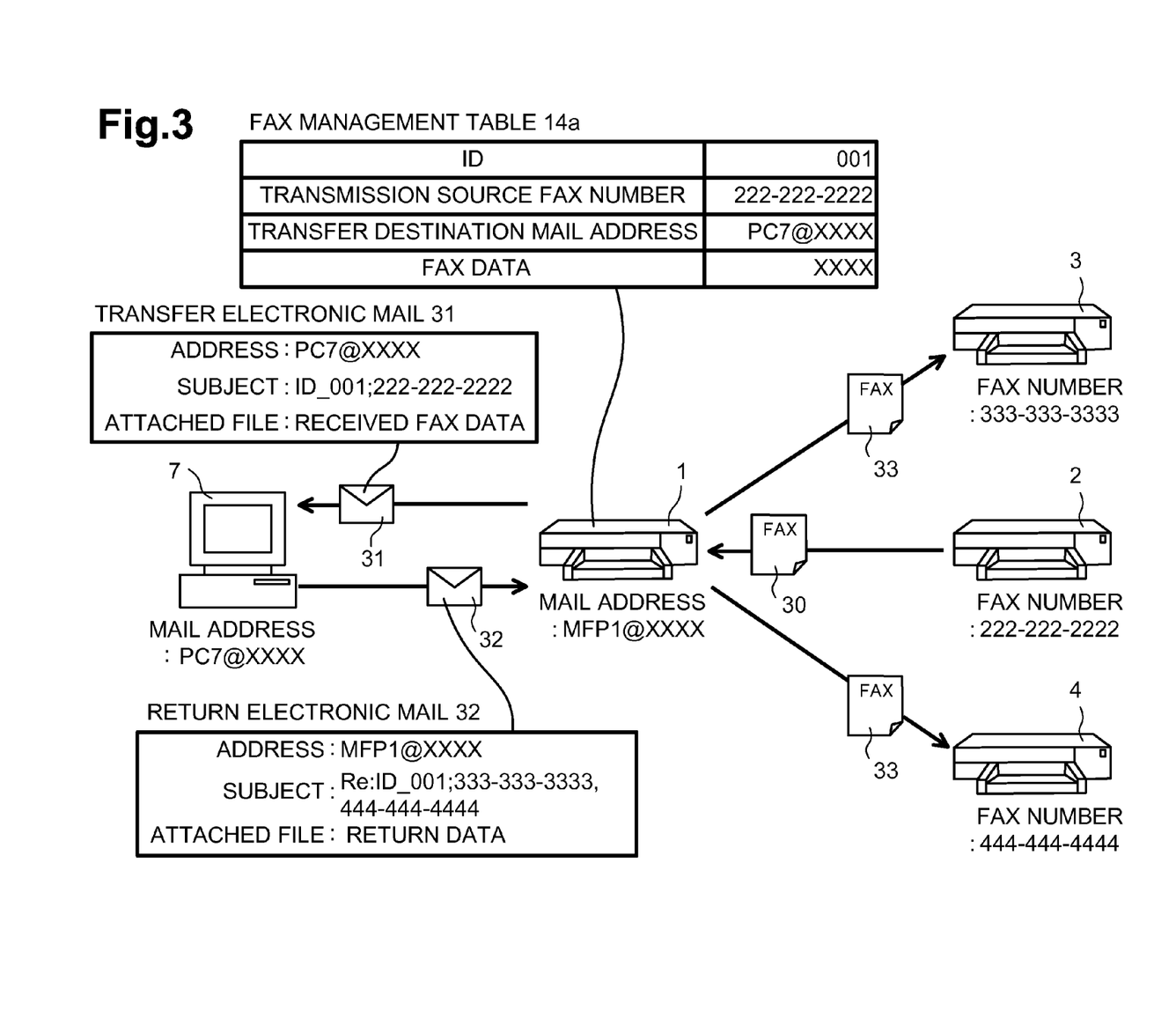
FIG. 3 is a diagram depicting the functions of an MFP according to another embodiment of the present invention.

Referring to FIG. 3, another embodiment of the functions of MFP 1 is depicted. MFP 1 may transmit a reply to facsimile devices 3 and 4 via the PC 7 in response to receiving FAX data 30 from facsimile device 2. MFP 1 may receive FAX data 30 from facsimile device 2 and may transfer electronic mail 31 to PC 7.

In return electronic mail 32 returned to MFP 1 by PC 7, the address may be set to the mail address of MFP 1, e.g., "MFP1@XXXX," and the subject may include the ID, e.g., "001," a FAX number of facsimile device 3, e.g., "333-333-3333," and a FAX number of facsimile device 4, e.g., "444-444-4444." Further, the return data created by PC 7 or the return data corresponding to the FAX data attached to transfer electronic mail 31 may be attached to return electronic mail 32 as an attached file.

The subject of return electronic mail 32 may not include the FAX number of the facsimile device 2, e.g., "222-222-2222," indicating the transmission source of the received FAX data, and may include the respective FAX numbers of facsimile devices 3 and 4. When return electronic mail 32 includes the ID, e.g., "001," MFP 1 may set facsimile devices 3 and 4 as the transmission destinations of the return data attached to return electronic mail 32, and may transmit the return data to facsimile devices 3 and 4 as return FAX data 33. Thus, return data to the FAX data 30 received from facsimile device 2 may be transmitted to facsimile devices 3 and 4. Therefore, it is possible to readily set the transmission destinations of the return data, e.g., facsimile devices 3 and 4, to be transmitted in response to receiving FAX data 30 from facsimile device 2.

Further, if return electronic mail 32 does not include attached file, e.g., "return data," the FAX data, e.g., "XXXX," stored in FAX management table 14a in association with the ID, e.g., "001," included in the subject of return electronic mail 32 may be transmitted to facsimile devices 3 and 4. Thus, it is therefore possible to transfer to facsimile devices 3 and 4 the FAX data received from facsimile device 2.

Figure 4:
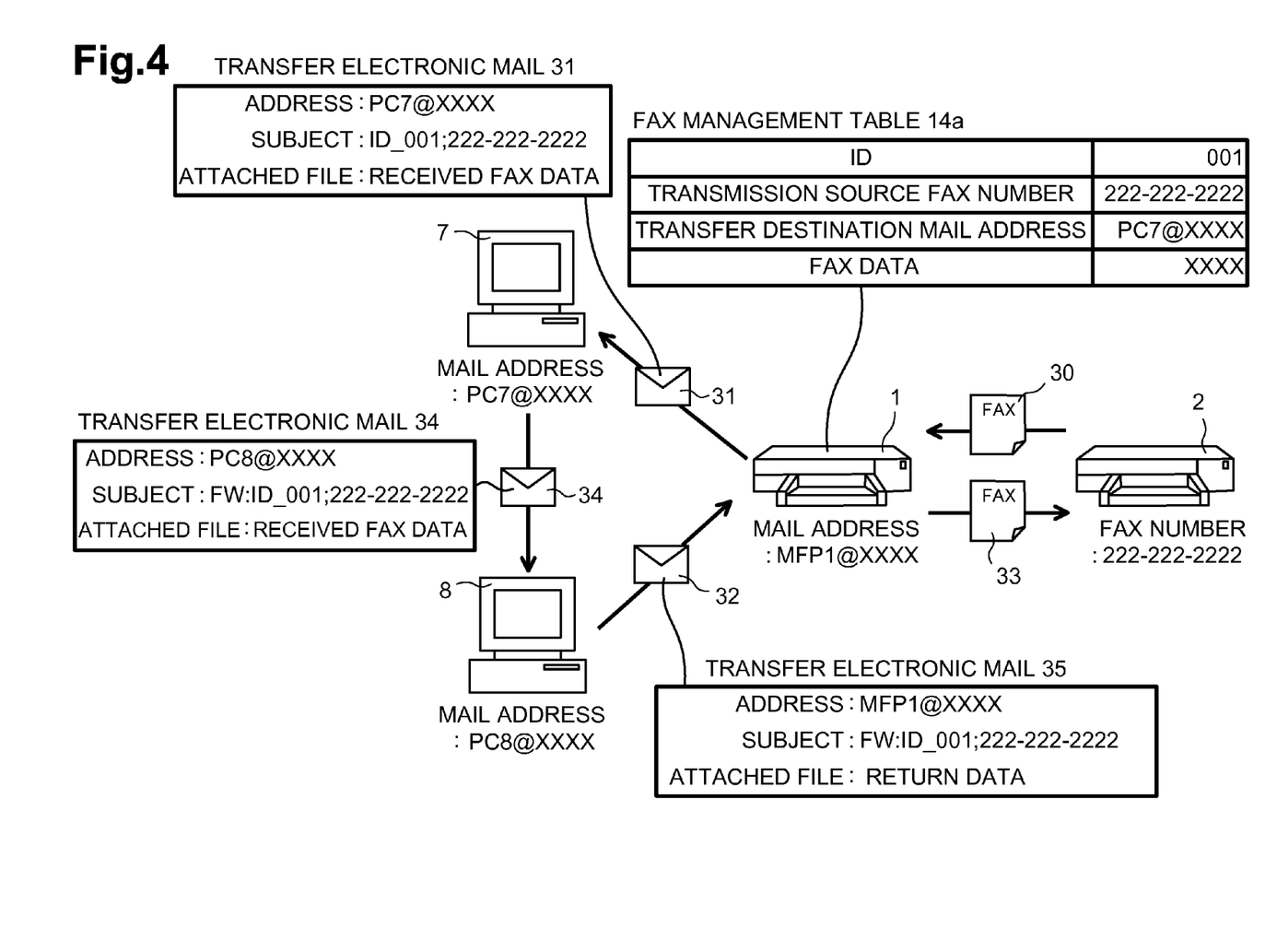
FIG. 4 is a diagram depicting the functions of an MFP according to yet another embodiment of the present invention.

Referring to FIG. 4, still another embodiment of the functions of MFP 1 is depicted. MFP 1 may transmit a reply to facsimile device 2 via PC's 7 and 8 in response to receiving FAX data 30 from facsimile device 2. MFP 1 may receive FAX data 30 from facsimile device 2 and may transmit transfer electronic mail 31 to PC 7. MFP 1 may receive a transfer electronic mail 35 from PC 8.

Upon receipt of transfer electronic mail 31 from MFP 1, PC 7 may transfer a transfer electronic mail 34 to PC 8 previously set as the transfer destination, by using the transfer function of the electronic mail program. In transfer electronic mail 34, the address may be set to a mail address of PC 8, e.g., "PC8@XXXX," and the subject may include the ID, e.g., "001," and the FAX number of facsimile device 2, e.g., "222-222-2222." The FAX data received from facsimile device 2 by MFP 1 may be attached to transfer electronic mail 34 as an attached file. The text of transfer electronic mail 34 may include the mail address of MFP 1, e.g., "MFP1@XXXX."

Upon receipt of transfer electronic mail 34 from PC 7, PC 8 may create return data, and may transfer the return data to MFP 1 by attaching the return data to transfer electronic mail 35 using of the transfer function of the electronic mail program. The text of transfer electronic mail 35 may include the mail address of MFP 1, e.g., "MFP1@XXXX," and the mail address of PC 7, e.g., "PC7@XXXX."

Upon receipt of transfer electronic mail 35 from PC 8, MFP 1 may transmit to facsimile device 2 the return data attached to transfer electronic mail 35 as return FAX data 33 if transfer electronic mail 35 includes the mail address of PC 7, e.g., "PC7@XXXX," serving as the transmission destination of transfer electronic mail 31. Thus, even if transfer electronic mail 35 is not received from PC 7 serving as the transmission destination of the electronic mail attached with the received FAX data but from PC 8 serving as the transfer destination of the electronic mail attached with the received FAX data, MFP 1 may reply to the FAX data received from facsimile device 2, without inputting the FAX number of facsimile device 2. Therefore, it is possible to readily set the transmission destination, e.g., facsimile device 2, of the return data to be transmitted in response to FAX data 30 received from facsimile device 2.

MFP 1 may transmit the return data when transfer electronic mail 35 includes the mail address of PC 7, e.g., "PC7@XXXX," serving as the transmission destination of transfer electronic mail 31. Thus, erroneous transmission of return data received from a device unrelated to PC 7 serving as the transmission destination of transfer electronic mail 31 may be prevented.

FIG. 5 is a flowchart depicting a FAX transferring process. In the FAX transferring process, the FAX data, e.g., facsimile data, received from the transmission source device by MFP 1 may be attached to an electronic mail and transferred to transfer destination mail address 14c. The FAX transferring process may be executed by CPU 10 of MFP 1, upon receipt of the FAX data from the transmission source device.

When the reception of the FAX data starts, CPU 10, e.g., facsimile receiving unit, may stand by until the completion of the reception of the FAX data, e.g., NO at Step S501. When the reception of the FAX data is completed, e.g., YES at Step S501, CPU 10, e.g., facsimile data storing unit, may store the received FAX data in FAX management table 14a at Step S502.

Upon receipt of the FAX data, CPU 10 may create an ID, e.g., identification information, indicating that the FAX data has been received at Step S503. CPU 10, e.g., storing unit, may store the created ID and the FAX number, e.g., transmission source information, indicating the transmission source of the received FAX data in FAX management table 14a and may associate the ID and the FAX number with the received FAX data at Step S504. In another embodiment, CPU 10 may store the created ID without storing the FAX number. In still another embodiment, CPU 10 may store the FAX number without storing the created ID.

The ID may be an unique information configured to distinguish the currently received FAX data from other FAX data. A different ID may be created for FAX data received from a different transmission source. A different ID may be created for different FAX data received from the same transmission source.

Having stored the ID and the FAX number of the transmission source, CPU 10 may determine whether transfer setting flag 14b is "ON" at Step S505. If transfer setting flag 14b is OFF, e.g., NO at Step S505; CPU 10 may determine that the transfer is unnecessary, and may terminate the process. If transfer setting flag 14b is ON, e.g., YES at Step S505; CPU 10 may determine that the transfer is necessary and may proceed to the process of Step S506.

At Step S506, CPU 10, e.g. external information storing unit, may store transfer destination mail address 14c, e.g., external information, in FAX management table 14a in association with the FAX data, such as FAX data 30, the ID, and the FAX number of the transmission source device. Having stored transfer destination mail address 14c, CPU 10, e.g., message transmitting unit, may transmit to the transfer destination, e.g., external device, indicated by transfer destination mail address 14c, an electronic mail, e.g., message, including the ID and the received FAX data at Step S507.

In the FAX transferring process, the received FAX data may be transferred to transfer destination mail address 14c as an attached file. Therefore, the transfer destination may be allowed to check the received FAX data. The transfer destination also may be allowed to create return data in response to the received FAX data. In an embodiment, the received FAX data may not be printed to save toner and print sheets.

FIG. 6 is a flowchart depicting the FAX returning process. In the FAX returning process, MFP 1 may return the return data to the transmission source device in response to receiving the FAX data from the transmission source device. The FAX returning process may be executed by CPU 10 of MFP 1 when MFP 1 begins to receive an electronic mail.

When the reception of an electronic mail begins, CPU 10, e.g., message receiving unit, may stand-by until the completion of the reception of the electronic mail. When the reception of the electronic mail is completed, e.g., YES at Step S601; CPU 10 may determine whether the received electronic mail includes an ID at Step S602. If the electronic mail is determined to include an ID, e.g., YES at Step S602; CPU 10 may set ID flag 14d to "ON" at Step S603. CPU 10, e.g., first message transmission source determining unit, may then determine whether the transmission source mail address of the received electronic mail is equal to, e.g., matches, transfer destination mail address 14c stored in FAX management table 14a in association with the ID included in the received electronic mail at Step S604.

If the transmission source mail address does not match transfer destination mail address 14c, e.g., NO at Step S604; CPU 10, e.g., second message transmission source determining unit, may further determine whether the text of the received electronic mail includes transfer destination mail address 14c at Step S605. At Step S605, the electronic mail transferred from MFP 1 to the transfer destination, e.g., transfer destination mail address 14c, was transferred from the transfer destination to another device, and the electronic mail received by MFP 1 is sent from the another device. Thus, CPU 10 may determine whether the text of the received electronic mail includes transfer destination mail address 14c.

If the text of the received electronic mail is determined not to include transfer destination mail address 14c, e.g., NO at Step S605; CPU 10 may terminate the FAX returning process on the assumption that the received electronic mail is unrelated to transfer destination mail address 14c. Thus, erroneous transmission may be prevented.

If the transmission source mail address of the received electronic mail is determined to be equal to, e.g., matches, transfer destination mail address 14c stored in FAX management table 14a in association with the ID included in the received electronic mail, e.g., YES at Step S604, if the text of the received electronic mail is determined to include transfer destination mail address 14c, e.g., YES at Step S605, or if the received electronic mail is determined not to include an ID, e.g., NO at Step S602, CPU 10 may proceed to the process at Step S606.

At Step S606, CPU 10 may determine whether ID flag 14d is "ON." If ID flag 14d is determined to be "ON," e.g., the received electronic mail includes an ID at Step S606, CPU 10 may execute a return destination setting process, as depicted in FIG. 7. In the return destination setting process, CPU 10 may set the return destination of the return FAX data converted from the return data attached to the received electronic mail as an attached file or the FAX data stored in FAX management table 14a, e.g., the FAX data received from the transmission source device, at Step S607. Then, CPU 10, e.g., facsimile transmitting unit, may facsimile-transmit the FAX data to the set return destination at Step S608 and may proceed to Step S612.

If ID flag 14d is determined not to be "ON," e.g., the received electronic mail does not include an ID; at Step S606, CPU 10 may determine whether the subject of the received electronic mail includes a FAX number at Step S609. If the subject of the received electronic mail is determined to include a FAX number, e.g., YES at Step S609, CPU 10, e.g., attached file determining unit, further may determine whether the received electronic mail include an attached file at Step S610. If the received electronic mail is determined to include an attached file, e.g., YES at Step S610, CPU 10 may set the FAX number included in the received electronic mail as the transmission destination at Step S611. CPU 10 then may then convert the return data attached as the attached file into return FAX data, and may facsimile-transmit the return FAX data to the set transmission destination at Step S608. CPU 10 may then proceed to Step S612.

Therefore, even if the transmission source of the received electronic mail has deleted the ID from the electronic mail, the return data still may be transmitted to the device indicated by the FAX number included in the subject of the electronic mail. If the electronic mail is determined not to include a FAX number, e.g., NO at Step S609, or if the electronic mail is determined not to include an attached file, e.g., NO at Step S610; CPU 10 may proceed to Step S612.

At Step S612, CPU 10, e.g., command determining unit, may determine whether the text of the received electronic mail includes a command. If the text of the received electronic mail is determined not to include a command, e.g., NO at Step S612; CPU 10 may terminate the FAX returning process. If the text of the received electronic mail is determined to include a command, e.g., YES at Step S612; CPU 10, e.g., command executing unit, may execute a process according to the command at Step S613, and then may terminate the FAX returning process.

At Step S613, if there is no specification of the target on which the command is to be executed, CPU 10 may set the command execution target to the FAX data stored in FAX management table 14a in association with the ID. For example, if the text of the received electronic mail includes a "delete" command, the FAX data stored in the FAX management table 14a in association with the ID may be deleted. Therefore, it is possible to describe the command without describing the target on which the command is to be executed. If there is no specification of the target on which the command is to be executed, and if ID flag 14d is "OFF," the command execution target may not be identified and the command may not be executed.

In the FAX returning process, the return destination of the attached file, e.g., return data, attached to the electronic mail received by MFP 1 may be set in the return destination setting process at Step S607 or at Step S611. Thus, MFP 1 may facsimile-transmit the return data without inputting the return destination of the return data.

FIG. 7 is a flowchart depicting the return destination setting process. The process may correspond to Step S607 in the FAX returning process depicted in FIG. 6. In the return destination setting process, CPU 10 of MFP 1 may set the return destination of the return data included in the received electronic mail, e.g., the file attached to the received electronic mail.

At Step 700, CPU 10 may determine whether the subject of the received electronic mail includes a FAX number. If the subject of the received electronic mail is determined not to include a FAX number, e.g., NO at Step S700; CPU 10 may extract the transmission source FAX number stored in FAX management table 14a in association with the ID at Step S701, and may proceed to Step S703.

If the subject of the received electronic mail is determined to include a FAX number, e.g., YES at Step S700, CPU 10 may extract one FAX number from the FAX number(s) included in the electronic mail at Step S713. At Step S702, CPU 10, e.g., device determining unit, may determine whether the FAX number extracted in Step S713 is equal to or matches the FAX number stored in FAX management table 14a in association with the ID, e.g., the FAX number of the transmission source device having transmitted the previously received FAX data. If the extracted FAX number is determined to equal to or matches the FAX number of the transmission source device associated with the ID, e.g., YES at Step S702; CPU 10 may proceed to Step S703.

CPU 10, e.g., attached file determining unit, may determine whether the received electronic mail includes an attached file at Step S703. If the received electronic mail is determined to include an attached file, e.g., YES at Step S703, CPU 10 may proceed to Step S705. If the received electronic mail is determined not to include an attached file, e.g., NO at Step S703; CPU 10 may skip the facsimile transmission process, e.g., Step S608 depicted in FIG. 6, on the assumption that there is no return data, and may proceed to Step S612 depicted in FIG. 6.

If the extracted FAX number is determined not to be equal to the FAX number of the transmission source device associated with the ID, e.g., NO at Step S702, CPU 10, e.g., transmission data determining unit, may determine whether the received electronic mail includes an attached file at Step S704. If the received electronic mail is determined to include an attached file, e.g., YES at Step S704; CPU 10 may proceed to Step S705.

At Step S705, CPU 10 may determine whether the same header information as the FAX data stored in the FAX management table 14a in association with the ID, e.g., FAX data received from the transmission source device, is included in the data of the attached file attached to the received electronic mail. Specifically, the FAX data stored in FAX management table 14a in association with the ID, e.g., FAX data received from the transmission source device, may comprise, as the header information, the date and time of receipt of the FAX data, the name of the transmission source device, and the FAX number of the transmission source device. At Step S705, CPU 10 may determine whether the header information is included in the data of the attached file and may determine whether the data of the attached file uses the received FAX data.

If the same header information is determined to be included in the data of the attached file, e.g., YES at Step S705, CPU 10, e.g., first header adding unit, may convert the data of the attached file into return FAX data at Step S706, and may add or overwrite the header information included in the return FAX data with the header information indicating MFP 1 including CPU 10 at Step S707. Thus, no additional data is added. Therefore, the return FAX data may be transmitted in the original size. At Step 708, CPU 10 may set the FAX number extracted at Step S701 or at Step S713 to the transmission destination of the converted return FAX data, and may proceed to Step S709.

Further, if the same header information is determined not to be included in the data of the attached file, e.g., the attached file of the electronic mail does not use the received FAX data; NO at Step S705, CPU 10 may convert the data of the attached file into return FAX data at Step S710. At Step 711, CPU 10 may reduce the size of return FAX data, and may add the header information of MFP 1 including CPU 10 to the return FAX data. At Step 708, CPU 10 may set the FAX number extracted in Step S701 or Step S713 to the transmission destination of the converted return FAX data, and may proceed to Step S709.

If the received electronic mail is determined to include the FAX number of the transmission source device, e.g., YES at Step S702, or if the received electronic mail is determined not to include a FAX number, e.g., NO at Step S700; the transmission destination of the return data may be set to the FAX number of the transmission source device at Step S708. Thus, it is possible to reply to the FAX data received from the transmission source device, without inputting the address of the transmission source device. Therefore, it is possible to readily set the transmission destination of the return data to be transmitted in response to the FAX data received from the transmission source device.

If the received electronic mail is determined to include a FAX number other than the FAX number of the transmission source device, e.g., NO at Step S702, and if the received electronic mail is determined to include a file attached thereto, e.g., YES at Step S704, the FAX number other than the FAX number of the transmission source device may be set to the transmission destination of the return data at Step S708. Thus, it is possible to transmit the return data to a device other than the transmission source device.

If the FAX number extracted in the process of Step S713 is determined not to be equal to the FAX number of the transmission source device associated with the ID, e.g., NO at Step S702, and if the received electronic mail is determined not to include an attached file, e.g., NO at Step S704; CPU 10 may perform the process at Step S712.

At Step S712, CPU 10, e.g., second header adding unit, may overwrite the header information of the FAX data stored in FAX management table 14a in association with the ID, e.g., FAX data received from the transmission source device, with the header information indicating MFP 1 including CPU 10. CPU 10 then may set the FAX number extracted in Step S713 to the transmission destination of the FAX data having the overwritten header information at Step S708, and may proceeds to Step S709.

Thus, it is possible to transfer, to a device other than the transmission source device, the FAX data received from the transmission source device. Further, there is no need to reduce the received FAX data and add to the FAX data the header information indicating the MFP 1 including the CPU 10. Therefore, the FAX data received from the transmission source device may be facsimile-transmitted in the original size.

After the FAX number extracted in Step S701 or S713 is set to the transmission destination at Step S708, CPU 10 may determine at Step S709 whether the processes in Step S713 have been executed on all of the FAX numbers included in the received electronic mail. If the processes have not been executed on all of the FAX numbers, e.g., NO at Step S709; the process may return to Step S713. If the processes have been executed on all of the FAX numbers, e.g., YES at Step S709; CPU 10 may terminate the return destination setting process.

If the determination is negative at Step S700, CPU 10 also may determine in Step S709 that the setting of all of the FAX numbers included in the electronic mail has been completed, e.g., YES at Step S709, and may terminate the return destination setting process.

In the above-described embodiments, the FAX data corresponding to the file attached to transfer electronic mail 31 transmitted from MFP 1 to PC 7 and to the file attached to transfer electronic mail 34 transmitted from PC 7 to PC 8 may be data in various formats, e.g., modified Huffman (MH), modified relative element address designate (MR), or modified modified relative element address designate (MMR) format used in facsimile transmission and reception, or may be text data or image data converted into, for example, joint photographic experts group (JPEG) or tagged image file format (TIFF) format. The conversion into image data may be performed by MFP 1 or PC 7 serving as the electronic mail transmission source device.

The return data corresponding to the file attached to return electronic mail 32 transmitted from PC 7 to MFP 1 and to the file attached to transfer electronic mail 35 transmitted from PC 8 to MFP 1 may be text data created by PC's 7 and 8, image data in, for example, JPEG or TIFF format, or data in, for example, MH, MR, or MMR format, which may be transmitted by facsimile. MFP 1 may convert the data for facsimile transmission at Steps S706 and S710. PC's 7 and 8 may create data in, for example, MH, MR, or MMR format, which may be transmitted by facsimile. MFP 1 may omit the process of conversion into the data for facsimile transmission.

In another embodiment, the received FAX data may not be include in the electronic mail, and an electronic mail including at least the ID may be transmitted to the transfer destination. If the electronic mail including the ID is received from the transfer destination, it is possible to identify the transmission source of the FAX data stored in association with the ID. Therefore, the return data may be return to the transmission source without inputting the address of the transmission source.

In another embodiment, a configuration may be employed in which, when an electronic mail is transmitted to the transfer destination, an ID unique to the individual electronic mail may be created, transmitted to the transfer destination as included in the electronic mail, and stored in association with the FAX number of the transmission source of the FAX data. If the electronic mail including the ID is received from the transfer destination, the transmission source of the FAX data stored in association with the ID may be identified. Therefore, the return data may be returned to the transmission source without inputting the address of the transmission source.

Further, in the above-described embodiments, the attached data attached to the electronic mail received by MFP 1 is used as the return data. The return data, however, may be all or a part of the text of the electronic mail.

Further, in the above-described embodiments, when the FAX data received by MFP 1 is transferred to the transfer destination by the electronic mail, the ID and the FAX number of the transmission source device are described in the subject of the electronic mail. In another embodiment, a configuration may be employed in which, if it is possible to include the ID and the FAX number of the transmission source device in the electronic mail to be transferred, the ID and the FAX number are described in the text of the electronic mail or in the attached file. Further, there is no need to describe both the ID and the FAX number of the transmission source device. Even with one of the ID and the FAX number, it is possible to return the return data to the transmission source device of the received FAX data.

In addition, in the above-described embodiments, if the return data includes the header information, the header information is overwritten with the header information of MFP 1 including CPU 10 in Steps S707 and S712 of FIG. 7. In another embodiment, a configuration may be employed in which the already included header information may not be overwritten, but may be added with the header information indicating MFP 1 including CPU 10. In this case, the recipient having received the return data may be allowed to infer the background of the return data.

The present invention has been described above on the basis of embodiments thereof. The present invention, however, is not limited to the above-described embodiments, and various improvements and modifications are possible within the scope not departing from the spirit of the present invention.

While the invention has been described connection with various exemplary structures and illustrative embodiments, it will be understood by those skilled in the art that other variations and modifications of the structures and embodiments describes above may be made without departing from the scope of the invention. Other structures and embodiments will be apparent to those skilled in the art from a construction of the specification or practice of the invention disclosed herein. It is intended that the specification and described examples are illustrative with the true scope of the invention being defined by the following claims.

What is claimed is:

1. A facsimile device comprising:
   a facsimile receiving unit configured to receive facsimile data transmitted from a transmission source device;
   a storing unit configured to store at least one of identification information and transmission source information of the facsimile data received by the facsimile receiving unit in a storing portion and to associate the identification information with the transmission source information, wherein the identification information distinguishes the facsimile data received by the facsimile receiving unit from other facsimile data received by the facsimile receiving unit, and the transmission source information indicates the transmission source device of the facsimile data;
   a message transmitting unit configured to transmit a message to an external device in response to receiving the facsimile data from the transmission source device, the message including the at least one of the identification information and the transmission source information of the facsimile data stored in the storing portion;
   a message receiving unit configured to receive a message transmitted from the external device or from another external device;
   an attached file determining unit configured to determine whether the message received by the message receiving unit includes an attached file;
   a converting unit configured to convert data of the attached file into facsimile-transmission data when the attached file determining unit determines that the message includes the attached file; and
   a facsimile transmitting unit configured to facsimile-transmit the facsimile-transmission data converted by the converting unit to the transmission source device indicated by the transmission source information stored in the storing portion in association with the identification information when the message received by the message receiving unit includes the identification information.

2. The facsimile device according to claim 1, further comprising:
   an external information storing unit configured to store external information indicating the external device to which the message transmitting unit has transmitted the message in the storing portion and associate the external information with the identification information or the transmission source information of the facsimile data;
   a first message transmission source determining unit configured to determine whether the message received by the message receiving unit is transmitted from the external device indicated by the external information;
   a control unit configured to control the facsimile transmitting unit to facsimile-transmit the facsimile-transmission data to the transmission source device when the first message transmission source determining unit determines that the message received by the message receiving unit is transmitted from the external device indicated by the external information.

3. The facsimile device according to claim 2, further comprising:
   a second message transmission source determining unit configured to determine whether the message received by the message receiving unit contains the identification information and the external information associated with the identification information in the storing portion when the first message transmission source determining unit determines that the message received by the message receiving unit is not transmitted from the external device indicated by the external information,
   wherein the control unit is configured to control the facsimile transmitting unit to facsimile-transmit the facsimile-transmission data to the transmission source device when the second message transmission source determining unit determines that the message received by the message receiving unit contains the identification information and the external information associated with the identification information in the storing portion.

4. The facsimile device according to claim 1,
   wherein the message transmitting unit transmits the message including the facsimile data received by the facsimile receiving unit to the external device,
   wherein the facsimile device further comprises:
   a facsimile data storing unit configured to store the facsimile data received by the facsimile receiving unit in the storing portion and associate the facsimile data with the identification information or the transmission source information; and
   a first header adding unit configured to add header information indicating the facsimile device to the facsimile-transmission data, if the header information included in the facsimile-transmission data indicates the transmission source device.

5. The facsimile device according to claim 1, further comprising:
   a facsimile data storing unit configured to store the facsimile data received by the facsimile receiving unit in the storing portion and associate the facsimile data with the identification information or the transmission source information stored in the storing portion;
   a command determining unit configured to determine whether the message received by the message receiving unit includes a command for instructing the execution of a predetermined operation when the message received by the message receiving unit includes the identification information; and
   a command executing unit configured to execute the command as an instruction to the facsimile data stored in the storing portion in association with the identification information included in the message when the command determining unit determines that the message includes the command.

6. The facsimile device according to claim 1, further comprising:
   a facsimile data storing unit configured to store the facsimile data received by the facsimile receiving unit in the storing portion and associate the facsimile data with the identification information or the transmission source information; and
   a device determining unit configured to determine whether the message received by the message receiving unit includes device information indicating a facsimile device different from the transmission source device when the message received by the message receiving unit includes the identification information,
   wherein, when the device determining unit determines that the message received by the message receiving unit includes the device information indicating a facsimile device different from the transmission source device, the facsimile transmitting unit transmits the facsimile-transmission data to the facsimile device indicated by the device information included in the message received by the message receiving unit.

7. A facsimile device comprising:
- a facsimile receiving unit configured to receive facsimile data transmitted from a transmission source device;
- a storing unit configured to store at least one of identification information and transmission source information of the facsimile data received by the facsimile receiving unit in a storing portion, wherein the identification information distinguishes the facsimile data received by the facsimile receiving unit from other facsimile data received by the facsimile receiving unit, and the transmission source information indicates the transmission source device of the facsimile data;
- a message transmitting unit configured to transmit a message to an external device in response to receiving the facsimile data from the transmission source device, the message including the at least one of the identification information and the transmission source information of the facsimile data stored in the storing portion;
- a message receiving unit configured to receive a message transmitted from the external device or from another external device;
- an attached file determining unit configured to determine whether the message received by the message receiving unit includes an attached file;
- a converting unit configured to convert data of the attached file into facsimile-transmission data when the attached file determining unit determines that the message includes the attached file; and
- a facsimile transmitting unit configured to facsimile-transmit the facsimile-transmission data converted by the converting unit to the transmission source device indicated by the transmission source information included in the message received by the message receiving unit.

8. The facsimile device according to claim 7,
- wherein the message transmitting unit transmits the message including the facsimile data received by the facsimile receiving unit to the external device,
- wherein the facsimile device further comprises:
  - a facsimile data storing unit configured to store the facsimile data received by the facsimile receiving unit in the storing portion and associate the facsimile data with the identification information or the transmission source information; and
  - a first header adding unit configured to add header information indicating the facsimile device to the facsimile-transmission data, if the header information included in the facsimile-transmission data indicates the transmission source device.

9. The facsimile device according to claim 7, further comprising:
- a facsimile data storing unit configured to store the facsimile data received by the facsimile receiving unit in the storing portion and associate the facsimile data with the identification information or the transmission source information; and
- a device determining unit configured to determine whether the message received by the message receiving unit includes device information indicating a facsimile device different from the transmission source device when the message received by the message receiving unit includes the identification information,
- wherein, when the device determining unit determines that the message received by the message receiving unit includes the device information indicating a facsimile device different from the transmission source device, the facsimile transmitting unit transmits the facsimile-transmission data to the facsimile device indicated by the device information included in the message received by the message receiving unit.

10. The facsimile device according to claim 9, further comprising:
- a transmission data determining unit configured to determine whether the message received by the message receiving unit includes the facsimile-transmission data,
- wherein, when the device determining unit determines that the message received by the message receiving unit includes the device information indicating a facsimile device different from the transmission source device and the transmission data determining unit determines that the message includes the facsimile-transmission data, the facsimile transmitting unit is configured to transmit the facsimile-transmission data to the facsimile device different from the transmission source device, and
- wherein, when the device determining unit determines that the message received by the message receiving unit includes the device information indicating a facsimile device different from the transmission source device and the transmission data determining unit determines that the message does not include the facsimile-transmission data, the facsimile transmitting unit is configured to transmit the facsimile data associated with the identification information stored in the storing portion to the facsimile device different from the transmission source device.

11. The facsimile device according to claim 10, wherein the facsimile transmitting unit comprises a second header adding unit configured to add header information indicating the facsimile device to the facsimile-transmission data, if the device determining unit determines that the message received by the message receiving unit includes the device information indicating a facsimile device different from the transmission source device and the transmission data determining unit determines that the message does not include the facsimile-transmission data.

12. The facsimile device according to claim 9, further comprising:
- a transmission data unit configured to determine whether the message received by the message receiving unit includes the facsimile-transmission data,
- wherein, when the device determining unit determines that the message received by the message receiving unit does not include the device information indicating a facsimile device different from the transmission source device and the transmission data determining unit determines that the message includes the facsimile-transmission data, the facsimile transmission unit is configured to transmit the facsimile-transmission data to the transmission source device.

13. A method for transmitting message from a facsimile device, the method comprising the steps of:
- receiving facsimile data transmitted from a transmission source device;
- storing at least one of identification information and transmission source information of the received facsimile data in a storing portion, wherein the identification information distinguishes the facsimile data from other facsimile data, and the transmission source information indicates the transmission source device of the facsimile data;
- transmitting a message to an external device in response to receiving the facsimile data from the transmission source device, wherein the message including at least one of the identification information and the transmission source information of the facsimile data stored in the storing portion;

receiving a message transmitted from the external device or from another external device;

determining whether the message received from the external device or from the another external device includes an attached file;

converting data of the attached file into facsimile-transmission data in response to determining that the message includes the attached file; and facsimile-transmitting the converted facsimile-transmission data to the transmission source device indicated by the transmission source information included in the received message.

14. A non-transitory, computer readable medium storing a message transmitting program that, when executed by a processor, cause a facsimile device to execute steps comprising:

receiving facsimile data transmitted from a transmission source device;

storing at least one of identification information and transmission source information of the received facsimile data in a storing portion, wherein the identification information distinguishes the facsimile data from other facsimile data, and the transmission source information indicates the transmission source device of the facsimile data;

transmitting a message to an external device in response to receiving the facsimile data from the transmission source device, wherein the message including at least one of the identification information and the transmission source information of the facsimile data stored in the storing portion;

receiving a message transmitted from the external device or from another external device;

determining whether the message received from the external device or from the another external device includes an attached file;

converting data of the attached file into facsimile-transmission data in response to determining that the message includes the attached file; and facsimile-transmitting the converted facsimile-transmission data to the transmission source device indicated by the transmission source information included in the received message.

\* \* \* \* \*